United States Patent [19]

van der Does

[11] 4,061,923
[45] Dec. 6, 1977

[54] RECEPTACLE FOR RADIOGRAPHIC FILM MATERIAL

[75] Inventor: Lucas van der Does, Oenkerk, Netherlands

[73] Assignee: N.V. Optische Industrie "de Oude Delft", Delft, Netherlands

[21] Appl. No.: 673,093

[22] Filed: Apr. 2, 1976

[30] Foreign Application Priority Data

Apr. 11, 1975 United Kingdom ............... 14969/75

[51] Int. Cl.² ........................................... G03B 41/16
[52] U.S. Cl. ................................................. 250/468
[58] Field of Search ............................. 250/468, 469

[56] References Cited

U.S. PATENT DOCUMENTS

| 3,567,931 | 3/1971 | Eelkema | 250/469 |
| 3,967,130 | 6/1976 | Decker | 250/468 |

FOREIGN PATENT DOCUMENTS

| 2,256,801 | 1972 | Germany | 250/468 |
| 1,140,064 | 1961 | Germany | 250/468 |

*Primary Examiner*—Bruce C. Anderson
*Attorney, Agent, or Firm*—Marn & Jangarathis

[57] ABSTRACT

A receptacle for radiographic film material comprising a first fluorescent screen disposed in a first path of movement extending around a first pair of rollers, and a second fluorescent screen disposed in a second path of movement extending around a second pair of rollers, the axes of all rollers being parallel to one another, and said two paths of movement being in part contiguous with each other, wherein at least one screen has a length shorter than the length of its path of movement, and that the screens are capable of being moved by a drive in one direction for receiving film material and in the opposite direction for delivering film material.

3 Claims, 4 Drawing Figures

RECEPTACLE FOR RADIOGRAPHIC FILM MATERIAL

This invention relates to a receptacle for radiographic film material. A known receptacle for radiographic film material comprises a pair of parallel, endless flourescent screens each trained about a pair of rollers, which screens are in contact with each other over a certain region, and a roll of radiographic film is passed between the two screens in the region where the screens touch each other.

Apart from practical difficulties in making such endless screens, in that the inevitable seam in each screen causes obscurity and inacuity in the radiographs produced, the construction necessarily involves that there are at all times two layers of screen between the patient and the film, whereas effective exposure of the film requires one screen on each side of the film only. The second layer of screen which is present between the patient and the film in this prior device absorbs part of the X-rays. Consequently, the production of a properly exposed radiograph requires a higher dose of radiation than would be the case without said second layer. As the amount of radiation should be kept as low as possible to minimize hazards to the patient's health, it is clear that this constitutes a definite disadvantage. An advantage of this prior construction as compared with other known constructions using a pair of screens in the form of sheats which can be swung apart to receive a sheet of film, is the self-loading effect of the endless screens.

It is an object of the present invention to provide a receptacle for radiographic film in which the dose of radiation required for optimum exposure of a sheet of film is as low as possible, while retaining the advantage of the self-loading effect of the screens.

According to the present invention there is provided a receptacle for radiographic film material comprising a first flourescent screen disposed in a first path of movement extending around a first pair of rollers, and a second fluorescent screen disposed in a second path of movement extending around a second pair of rollers, the axes of all rollers being parallel to one another, and said two paths of movement being in part contiguous with each other, characterized in that at least one screen has a length shorter than the length of its path of movement, and that the screens are capable of being moved by a drive in one direction for receiving film material and in the opposite direction for delivering film material.

In a preferred embodiment of the invention, the screens are coupled linearly and transversely to the direction of movement. As a consequence the screens can be driven in a simple manner from a single driving motor.

In a further embodiment, which is of advantage in order that a film may be properly loaded between the two screens, at least a portion of the contiguous parts of said paths of movement is disposed between a pair of hold-down plates, one of which is immovable relatively to the screens, the other being movable substantially at right angles to the plane of the paths of movement at the location in question.

In a further preferred embodiment of the invention the movement of both screens and the movable hold-down plate is effected by a single drive.

One embodiment of the invention will be described, by way of example, with reference to the accompanying diagrammatic drawings. In said drawings.

Figure 1:
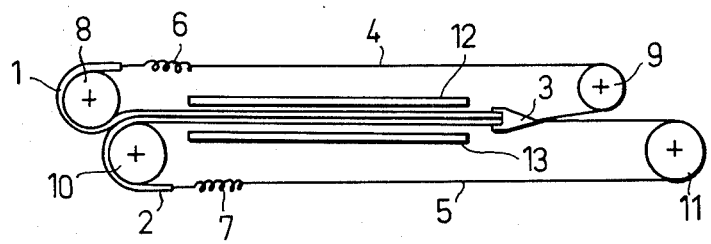
FIG. 1 shows the arrangement of the screens in a receptacle according to the present invention.

Referring to FIG. 1, there are shown a pair of screens 1, 2, linearly connected together at their ends by means of a coupling member 3. The opposite edge of each screen 1, 2 is connected to coupling member 3 by means of a string 4, 5 and a spring 6, 7. The endless assemblies thus formed are each trained about a pair of guide rollers 8, 9 and 10, 11, respectively. The guide rollers are disposed so that a portion of the path of movement around rollers 8, 9 coincides with a portion of that around rollers 10, 11. These coinciding portions of the paths of movement are positioned largely between a pair of hold-down plates, i.e. a fixedly disposed plate 12 and a plate 13 movable substantially at right angles to the plane of said coinciding portions of the paths of movement.

The receptacle is shown in FIG. 1 in the loaded, non-pressed state, i.e. the state in which a sheet of film material is present between screens 1, 2, but is not pressed to a flat state by plates 12, 13. The assembly can be driven either my moving one of the screens or by rotating one of the guide rollers.

Figure 2:
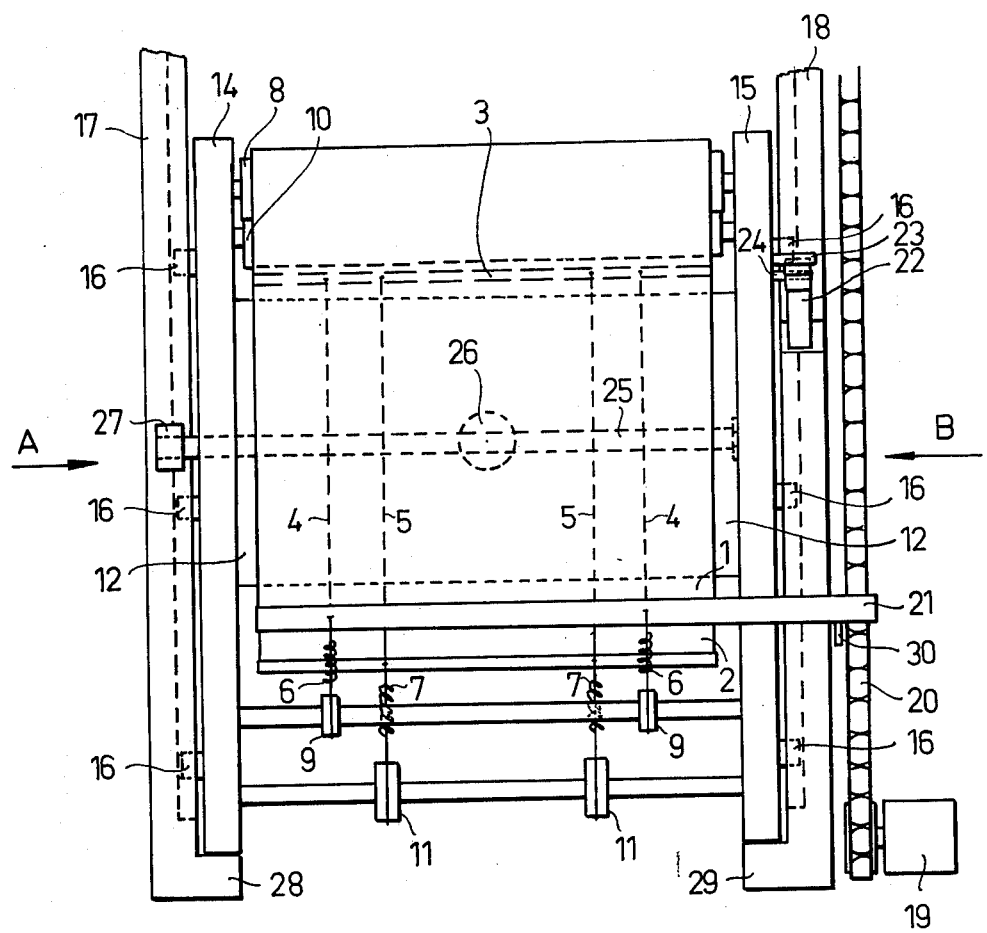
FIG. 2 is a plan view of the receptacle according to the invention.

In FIG. 2, parts corresponding to the showing of FIG. 1 are designated by the same reference numerals, and the receptacle is shown in the non-loaded state, in which coupling member 3 is in the position nearest rollers 8 and 10. The assembly of FIG. 1 is shown in FIG. 2 to be mounted in a carriage with sidewalls 14, 15. The carriage travels on wheels 16 relatively to a frame with longitudinal girders 17, 18. Wheel 16 run in slots formed in girders 17 and 18 of the frame.

Both screens 1, 2 and the carriage are driven by means of a motor 19 through a chain 20, which extends parallel to girder 18. Rigidly connected to chain 20 is a strip 21, which is in turn connected to the edge of screen 1 opposite to that coupled to the other screen.

Strip 21 is arranged to co-operate with a hook member 22 capable of performing a pivotal movement around a shaft 24 secured to sidewall 15 of the carriage, which movement is limited by a notch in girder 18 (see FIG. 4) and a pin 23. The function of this hook member will be described hereinafter.

The movement of plate 13 is controlled by an arm 25, pivoted on one end to sidewall 15 of the carriage, and articulated approximately halfway its length by means of an intermediate member 26 to plate 13. At the other end of arm 25 there is mounted a roller 27 having an axis parallel to the longitudinal extent of arm 25. Roller 27 runs over an integral moulding formed in the top surface of girder 17 (see FIG. 3). Plate 12 is rigidly connected to the carriage.

Figure 3:
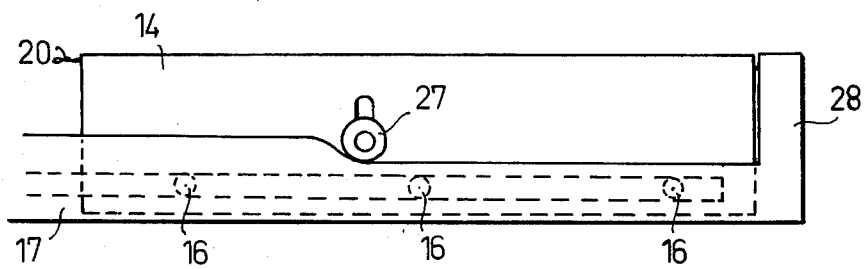
FIG. 3 is a side-elevational view of the receptacle, viewed in the direction of the arrow A in FIG. 2
Figure 4:
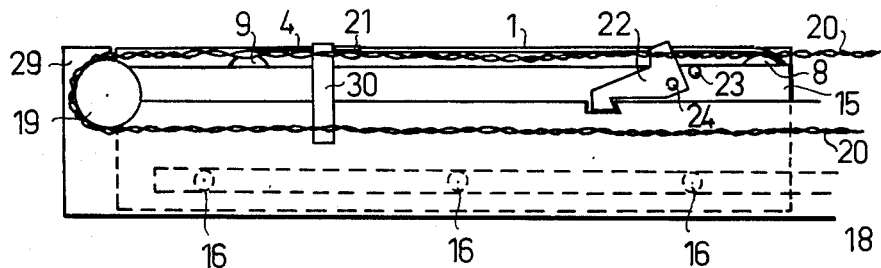
FIG. 4 is a side-elevational view of the receptacle, viewed in the direction of the arrow B in FIG. 2.

The operation of the receptacle shown in FIG. 2–4 is as follows.

Starting from the non-loaded state shown, first motor 19 is switched on. At the same time a sheet of film material is fed into the receiving nip between screens 1 and 2 at rollers 8 and 10 (see FIG. 1). Motor 19 drives chain 20 for the latter to move strip 21 upwards in FIG. 2 and to the right in FIG. 4. As the carriage is locked from movement by hook member 22, this movement of strip 21 will result in movement of screens 1, 2. As a result the sheet of film material is fed into the receptacle between screens 1, 2 until it is both entirely between screens 1, 2 and entirely between plates 12, 13. At the movement when the position shown in FIG. 1 is reached strip 21 comes into contact with the top of hook member 22, causing the latter to turn about shaft 24 until it strikes against pin 23. The movement of screens 1, 2 is then blocked and the carriage is released, whereafter a second operational phase begins, namely the movement of the carriage.

At the moment when the carriage begins to move roller 27 runs up the moulding on girder 17, causing arm 25 to turn and plate 13 to rise, whereby the sheet of film material is pressed flat and fixed between screens 1, 2 through co-operation of plates 12, 13.

The sheet of film is now in position for exposure, and the carriage rolls further to an exposure station (not shown), where motor 19 is switched off.

After the exposure, motor 19 is again switched on, but this time so that chain 20 is driven for movement in the opposite direction. The concomitant displacement of strip 21 will cause the carriage to return without moving the screens, which are retained by plate 13. The movement of the carriage is stopped by stops 28 and 29 arranged on the girders. At the moment when the carriage is stopped, roller 27 has just arrived at the bottom of the moulding on girder 17.

Further movement of chain 20 with strip 21 releases hook member 22, which falls into the notch in crossbeam 18, and will move the screens for the latter to feed out the exposed sheet of film material to a receiving cassette (not shown). The movement of screens 1, 2 is terminated when strip 21 strikes against a micro-switch mounted on a member 30 rigidly secured to girder 18, whereby motor 19 is switched off.

The device is then ready for the next cycle.

In the arrangement described above, a single motor is used for driving the carriage, screens 1, 2 and plate 13.

It will be understood that the embodiment described is given by way of illustration of the invention only, and that many modifications and variants will readily occur to those skilled in the art without departing from the scope of the invention.

I claim:

1. A radiographic film transport for X-ray equipment which comprises:
   a first pair of parallelly-disposed rollers including a lead roller and a back roller;
   a second pair of parallelly-disposed rollers including a lead roller and a back roller, said lead rollers of said first and second pair of rollers cooperating to form a nip therebetween;
   a first fluorescent screen;
   a second fluorescent screen;
   a coupling member for linearly coupling one end of each of said first and second fluorescent screens;
   a first connecting means connecting the other end of said first fluorescent screen to said coupling member for coursing said first fluorescent screen including first connecting means about said first pair of parallelly-disposed rollers;
   a second connecting means connecting the other end of said second fluorescent screen to said coupling member for coursing said second fluorescent screen including second connecting means about said second pair of parallelly-disposed rollers;
   motive means for moving said first and second fluorescent screens about said first and second pair of parallelly-disposed rollers to cause said coupling member to move between said lead rollers and said back rollers thereby to permit the introduction of film material between said fluorescent screens when said coupling member moves in one direction and to deliver film material when said coupling member moves in an opposite direction.

2. The radiographic film transport as defined in claim 1 wherein said fluorescent screens are disposed between a pair of hold-down plates, one of said hold-down plates being immovable and the other of said hold-down plates being movable substantially at right angles to the plane of the path of movement of said fluorescent screens.

3. The radiographic film transport as defined in claim 2 wherein movement of said fluorescent screens and said movable hold-down plate is effected by a single motive means.

* * * * *